United States Patent Office 2,848,335
Patented Aug. 19, 1958

2,848,335
STABILIZATION OF NORMALLY OXIDIZABLE MATERIALS WITH HYDROXYBENZAMIDE COMPOUNDS

Alan Bell and Gerald R. Lappin, Kingsport, Tenn., assignors to Eastman Kodak Company, Rochester, N. Y., a corporation of New Jersey No Drawing. Application March 25, 1954
Serial No. 418,746

18 Claims. (Cl. 99—163)

This invention relates to the stabilization of normally oxidizable materials. The invention is more particularly directed to compositions of matter comprising a normally oxidizable material stabilized with a benzamide compound having at least two nuclear hydroxy groups. The invention is also directed to certain of the hydroxybenzamide compounds as new compounds.

Many materials including fats, oils and hydrocarbons are normally subject to the deleterious effects of oxidation upon storage. Accordingly, it is usually desirable to incorporate in normally oxidizable materials a sufficient amount of a stabilizing material (inhibitor) which is effective to reduce the oxidation to an unobjectionable level. One of the principal deleterious effects of oxidation is the development of rancidity. The prevention of rancidity is especially important in the case of edible products such as the edible fats and oils. Similarly, gasolines, especially cracked gasolines, tend to form gummy deposits on standing which impair their utility. Thus, in the case of gasolines the prevention of gummy deposits is very important.

Satisfactory inhibitors for edible fats and oils must be non-toxic, must not impart undesirable color, odor or taste to the fats and oils, and must not be so volatile that they are removed from the fats and oils during cooking or in deep fat frying. Additionally, the inhibitor is preferably readily soluble in edible fats and oils in order to be easily incorporated therein.

It is an object of our invention to provide stabilized compositions of normally oxidizable materials. Another object of our invention is to stabilize normally oxidizable materials by uniformly incorporating therein a stabilizing amount of a benzamide compound having at least two nuclear hydroxy groups. Another object is to provide new hydroxybenzamide compounds having widespread utility as antioxidants. A still further object is to provide fat and oil compositions stabilized with a benzamide compound having at least two nuclear hydroxy groups.

We have discovered that benzamide compounds having at least two nuclear hydroxy groups have widespread utility as antioxidants for normally oxidizable materials. Our invention is particularly directed to the stabilization of normally oxidizable materials with the hydroxybenzamide having the formulas:

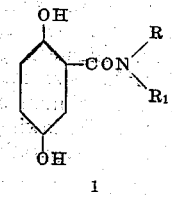

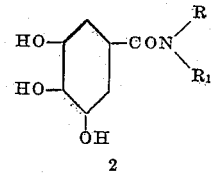

and

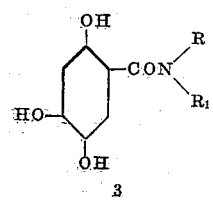

wherein R and $R_1$ each represents a hydrogen atom, an alkyl group or a monocyclic aryl nucleus of the benzene series. The compounds which appear to be most effective are those having the formulas numbered 1 and 3 and in which one of the members R and $R_1$ is a hydrogen atom while the other is an alkyl group or a monocyclic aryl nucleus of the benzene series. These compounds are believed to be new compounds and claim is laid thereto. When either R or $R_1$ is a monocyclic aryl nucleus of the benzene series, it may be the phenyl nucleus or a phenyl nucleus substituted, for example, with an alkyl group such as a methyl, an ethyl, a propyl or a butyl group, an alkoxy group such as a methoxy, an ethoxy, a propoxy group or a butoxy group, a hydroxy group, a chlorine atom, a bromine atom, a fluorine atom or a nitro group.

Compounds having the formulas 1 and 2 may be referred to as gentisamides and gallamides, respectively.

The hydroxybenzamide antioxidant compounds can be prepared in any suitable manner. Starting with the appropriate hydroxybenzoic acid, i. e. 2,5-dihydroxybenzoic acid (gentisic acid), 3,4,5-trihydroxybenzoic (gallic acid) or 2,4,5-trihydroxybenzoic acid the hydroxybenzamide compounds can be prepared by the following general procedure:

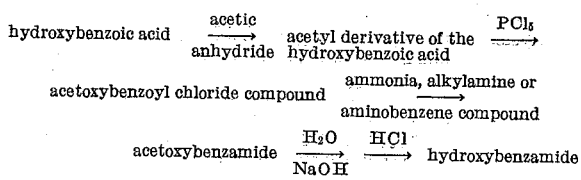

Alternately the N-substituted hydroxybenzamide compounds can be prepared by reacting the hydroxybenzoic acid or its ester with the appropriate amine (i. e. alkylamine or aminobenzene). Further gentisamide, gallamide and 2,4,5-trihydroxybenzamide can be prepared by reacting 2,5-dihydroxybenzoic ethyl ester, 3,4,5-trihydroxybenzoic ethyl ester and 2,4,5-trihydroxybenzoic ethyl ester, respectively, with ammonia.

So far as we are aware the hydroxybenzamide compounds described hereinbefore can be used for stabilizing any materials which are normally subject to oxidation. Thus, for example, these stabilizers or inhibitors may be used to stabilize edible fats and oils of animal, mineral and vegetable origin. Typical edible fats and oils include linseed oil, menhaden oil, cod-liver oil, castor oil, olive oil, rapeseed oil, coconut oil, palm oil, cottonseed oil, soybean oil, corn oil, peanut oil, sesame oil, babassu oil, butter, fat, lard, beef tallow and glycerides, including both the solid fats and the fatty oils. Similarly, free fatty acids such as oleic acid and similar readily oxidizable fatty acids can be stabilized. Further, the hydroxybenzamide compounds can be used for stabilizing hydrocarbons such as cracked gasoline and petroleum oils as well as rubber.

The amount of antioxidant which is employed in practicing our invention can be varied depending upon the material being stabilized, the degree of stabilization desired, the presence or absence of other stabilizing materials and similar variable factors. In most cases, the stabilizers are employed in concentrations of from about 0.005% to about 0.5% by weight based on the total weight of the composition being stabilized. Larger amounts such as amounts of as much as 1% or 2% can be used without deleterious effects, but such larger amounts are usually not necessary for optimum stabilization.

The preparation of typical hydroxybenzamide antioxidant compounds is illustrated in the following examples. Other hydroxybenzamide antioxidant compounds having the formulas designated 1, 2 or 3 can be prepared in a similar manner as the compounds specifically described hereinafter and it is not intended that the invention shall be limited to the specific compounds which are included for purposes of illustration.

EXAMPLE 1

*2,5-dihydroxybenzanilide (gentisanilide)*

21 grams of phosphorus pentachloride were added with stirring to a suspension of 15 grams of gentisic acid diacetate in 250 cc. of benzene. The reaction mixture was stirred until a clear solution resulted, about 30 minutes, after which the benzene and phosphorus oxychloride by-product were removed by evaporation at 80° C. and 30 mm. pressure. The resulting crude 2,5-diacetoxybenzoyl chloride was dissolved in ethyl ether and added to a solution of 19 grams of aniline in ethyl ether. A rapid reaction ensued and after the reaction mixture had stood for several hours, the aniline hydrochloride formed was removed by filtration. Evaporation of the filtrate gave crude 2,5-diacetoxybenzanilide. Without further purification the 2,5-diacetoxybenzanilide was dissolved in 200 cc. of warm (50° C.) 10% aqueous sodium hydroxide and the solution resulting was immediately cooled to 5° C.–10° C. and acidified with hydrogen chloride. The crude 2,5-dihydroxybenzanilide which separated from the reaction mixture was recovered by filtration, air dried and recrystallized from ethyl alcohol. 19 grams (83%) of pure 2,5-dihydroxybenzanilide were obtained as white crystals having a melting point of 187° C.–188° C. Analysis, calculated for $C_{13}H_{11}O_3N$—C, 68.0; H, 4.99; N, 6.12; Found—C, 67.88; H, 5.12; N, 6.25.

EXAMPLE 2

*N-n-butyl-2,5-dihydroxybenzamide (N-n-butylgentisamide)*

A solution of 15.4 grams of 2,5-diacetoxybenzoyl chloride, prepared as described in Example 1, in ethyl ether was added to 9 grams of n-butylamine in ethyl ether. Following a procedure identical to that described in Example 1 for the preparation of 2,5-dihydroxybenzanilide 10 grams (80%) of N-n-butyl-2,5-dihydroxybenzamide were obtained in the form of white crystals melting at 85° C.–86° C. Analysis, calculated for $C_{11}H_{15}O_3N$—C, 63.2; H, 7.19; N, 6.69; Found—C, 63.0; H, 7.24; N, 7.15.

EXAMPLE 3

*N,N-n-dibutyl-2,5-dihydroxybenzamide (N,N-n-dibutylgentisamide)*

A solution of 15.4 grams of 2,5-diacetoxybenzoyl chloride, prepared as described in Example 1, in ethyl ether was added to 16 grams of n-dibutylamine in ethyl ether. Following a procedure identical to that described in Example 1 for the preparation of 2,5-dihydroxybenzanilide 12 grams (76%) of N,N-n-dibutyl-2,5-dihydroxybenzamide were obtained as white crystals melting at 103° C.–105° C. Analysis, calculated for $C_{15}H_{23}O_3N$—C, 67.9; H, 8.73; N, 5.28; Found—C, 67.6; H, 8.92; N, 5.36.

EXAMPLE 4

*N-n-dodecyl-2,5-dihydroxybenzamide (N-n-dodecylgentisamide)*

A solution of 15.4 grams of 2,5-diacetoxybenzoyl chloride, prepared as described in Example 1, in ethyl ether was added to 22 grams of n-dodecylamine in ethyl ether. Following a procedure identical to that described in Example 1 for the preparation of 2,5-dihydroxybenzanilide 14 grams (74%) of N-n-dodecyl-2,5-dihydroxybenzamide were obtained as pale tan crystals melting at 77° C.–79° C. Analysis, calculated for $C_{19}H_{31}O_3N$—C, 71.0; H, 9.72; N, 4.35; Found—C, 70.7; H, 9.79; N, 4.48.

EXAMPLE 5

*2,4,5-trihydroxybenzanilide*

2,4,5-triacetoxybenzoyl chloride was prepared from 22 grams of 2,4,5-triacetoxybenzoic acid and 16 grams of phosphorus pentachloride by the method described in Example 1 for the preparation of 2,5-diacetoxybenzoyl chloride. The crude 2,4,5-triacetoxybenzoyl chloride was dissolved in ethyl ether and added to a solution of 19 grams of aniline in ethyl ether. Following the procedure described in Example 1 for the preparation of 2,5-dihydroxybenzanilide, 12.5 grams (68%) of 2,4,5-trihydroxybenzanilide were obtained as white crystals melting at 209° C.–211° C. Analysis, calculated for $C_{13}H_{11}O_4N$—C, 63.8; H, 4.50; N, 5.72; Found—C, 63.4; H, 4.63; N, 5.85.

EXAMPLE 6

*2,5-dihydroxybenz-p-anisidide (gentis-p-anisidide)*

A solution of 25.6 grams of 2,5-diacetoxybenzoyl chloride, prepared as described in Example 1, in ethyl ether was added to 24.6 grams of p-anisidine in ethyl ether. Following a procedure identical to that described in Example 1 for the preparation of 2,5-dihydroxybenzanilide, 16 grams (62%) of gentis-p-anisidide were obtained having a melting point of 114° C.–115° C. Analysis, calculated for $C_{14}H_{13}O_4N$—C, 64.95; H, 5.02; N, 5.41; Found—C, 65.1; H, 5.01; N, 5.56.

EXAMPLE 7

*N-(2-pyridyl)-2,5-dihydroxybenzamide (N-[2-pyridyl]-gentisamide)*

A solution of 25.6 grams of 2,5-diacetoxybenzoyl chloride, prepared as in Example 1, in ethyl ether was added to 18.8 grams of 2-aminopyridine in ethyl ether. Following a procedure identical to that described in Example 1 for the preparation of 2,5-dihydroxybenzanilide, 10 grams (43%) of N-(2-pyridyl)-gentisamide were obtained having a melting point of 222° C.–225° C. Analysis, calculated for $C_{12}H_{10}O_3N_2$—C, 62.7; H, 4.45; N, 11.72; Found—C, 62.6; H, 4.51; N, 11.67.

EXAMPLE 8

*2,4,5-trihydroxybenz-p-anisidide*

2,4,5-triacetoxybenzoyl chloride was prepared from 2,4,5-acetoxybenzoic acid and phosphorus pentachloride by the method described in Example 1 for the preparation of 2,5-diacetoxybenzoyl chloride. Twenty-five grams of the crude 2,4,5-triacetoxybenzoyl chloride were dissolved in ethyl ether and added to a solution of 12 grams of p-anisidine in ethyl ether. Following the procedure described in Example 1 for the preparation of 2,5-dihydroxybenzanilide, 9.6 grams (42%) of 2,4,5-trihydroxybenz-p-anisidide were obtained as white crystals melting at 154° C.–156° C. Analysis, calculated for $C_{14}H_{13}O_5N$—C, 61.1; H, 4.73; N, 5.09; Found—C, 60.9; H, 4.70; N, 5.13.

EXAMPLE 9

*N-dodecyl-2,4,5-trihydroxybenzamide*

2,4,5-triacetoxybenzoyl chloride was prepared from 2,4,5-triacetoxybenzoic acid and phosphorus pentachloride by the method described in Example 1 for the preparation of 2,5-diacetoxybenzoyl chloride. Eighteen grams of crude 2,4,5-triacetoxybenzoyl chloride were therefor dissolved in ethyl ether and added to a solution of 22 grams of dodecylamine in ethyl ether. Following the procedure described in Example 1 for the preparation of 2,5-dihydroxybenzanilide, 12 grams (62%) of N-dodecyl-2,4,5-trihydroxybenzamide were obtained as tan crystals melting at 105° C.–108° C. Analysis, calculated for $C_{19}H_{31}O_4N$—C, 67.8; H, 9.21; N, 4.16; Found—C, 67.9; H, 9.23; N, 4.13.

Other hydroxybenzamide compounds that can be used to stabilize normally oxidizable materials in accordance with our invention include 2,5-dihydroxybenzamide, N - methyl - 2,5 - dihydroxybenzamide, N - ethyl - 2,5 - dihydroxybenzamide, N - isopropyl - 2,5 - dihydroxybenzamide, N - isobutyl - 2,5 - dihydroxybenzamide, N- n - hexyl - 2,5 - dihydroxybenzamide, N - n - octyl - 2,5-dihydroxybenzamide, N - n - decyl - 2,5 - dihydroxybenzamide, N,N - dimethyl - 2,5 - dihydroxybenzamide, N,N - diethyl - 2,5 - dihydroxybenzamide, 3,4,5 - trihydroxybenzamide, 3,4,5 - trihydroxybenzanilide, N-methyl - 3,4,5 - trihydroxybenzamide, N - ethyl - 3,4,5 - trihydroxybenzamide, N - n - propyl - 3,4,5 - trihydroxybenzamide, N - n - butyl-3,4,5-trihydroxybenzamide, N-n-hexyl - 3,4,5 - trihydroxybenzamide, N - n - octyl - 3,4,5-trihydroxybenzamide, N - n - decyl - 3,4,5 - trihydroxybenzamide, N,N - dimethyl - 3,4,5 - trihydroxybenzamide, N,N - diethyl - 3,4,5 - trihydroxybenzamide, 2,4,5 - trihydroxybenzamide, N - methyl - 2,4,5 - trihydroxybenzamide, N - ethyl - 2,4,5 - trihydroxybenzamide, N - n-propyl - 2,4,5 - trihydroxybenzamide, N - n - butyl-2,4,5 - trihydroxybenzamide, N - n - hexyl - 2,4,5 - trihydroxybenzamide, N - n- octyl - 2,4,5 - trihydroxybenzamide, N - n - decyl - 2,4,5 - trihydroxybenzamide, N,N-dimethyl - 2,4,5 - trihydroxybenzamide and N,N - diethyl-2,4,5-trihydroxybenzamide. These compounds are readily prepared in accordance with the procedure described hereinbefore.

Samples of the same lard were stabilized with equal amounts of butylated hydroxyanisole and ten typical antioxidants of our invention. The resulting compositions were then subjected to the A. O. M. test and compared with an unstabilized sample of the lard. The results obtained are set out in Table 1. The data listed in the column headed A. O. M. (active oxygen method) represents the number of hours which were necessary to reach a peroxide content of 20 milliequivalents per kilogram of lard. The last column in the table designated A. I. represents an antioxidant index wherein the stabilized compositions embodying our invention were compared with the butylated hydroxyanisole composition as a standard. These results for lard were as follows:

TABLE 1

| Antioxidant | Concentration, percent | A. O. M., hr. | A. I. |
|---|---|---|---|
| None | | 8.0 | |
| Butylated hydroxy-anisole | 0.02 | 25.0 | 1.0 |
| Gallanilide | 0.02 | 78.0 | 4.1 |
| Gentisanilide | 0.02 | 105.0 | 5.7 |
| Gentis-p-anisidide | 0.02 | 112.0 | 5.8 |
| N-(2-pyridyl)-gentisamide | 0.02 | 34.0 | 1.4 |
| 2,4,5-Trihydroxybenzanilide | 0.02 | 124.0 | 6.5 |
| 2,4,5-Trihydroxybenzanisidide | 0.02 | 130.0 | 6.7 |
| N-n-Dodecyl-2,4,5-trihydroxybenzamide | 0.02 | 70.0 | 3.4 |
| N-n-Butylgentisamide | 0.02 | 75.0 | 3.7 |
| N,N-n-Dibutylgentisamide | 0.02 | 44.0 | 1.9 |
| N-n-Dodecylgentisamide | 0.02 | 54.0 | 2.4 |

The following table demonstrates the effectiveness of hydroxybenzamides as antioxidants for vegetable oils:

TABLE 2

| Antioxidant | Concentration, percent | A. O. M. Cottonseed Oil | A. O. M. Peanut Oil | A. O. M. Castor Oil |
|---|---|---|---|---|
| None | | 7.0 | 7.5 | 35 |
| BHA | 0.02 | 7.0 | 7.5 | 30 |
| Gentisanilide | 0.02 | 12.5 | 23 | 55 |
| N-Butyl gentisamide | 0.02 | 10 | 15 | 46 |
| Gentis-p-anisidide | 0.02 | 12 | 25 | 47 |
| N-Dodecyl gentisamide | 0.02 | 10 | 12 | 40 |
| 2,4,5-Trihydroxybenzanilide | 0.02 | 15 | 24 | 60 |
| N-Butyl-2,4,5-trihydroxybenzamide | 0.02 | 11 | 20 | 52 |

From the tables it is seen that greatly improved stabilities were obtained in accordance with our invention. In utilizing the hydroxybenzamide compounds employed in carrying out our invention it may be desirable in some cases to employ mixtures of one or more of such hydroxybenzamide compounds with other antioxidant materials such as butylated hydroxyanisole, tocopherol or similar well known antioxidants with or without the simultaneous use of a synergizing acid such as citric acid or ortho phosphoric acid. Compositions of matter comprising a normally oxidizable material containing one or more other antioxidant materials in combination with the hydroxybenzamide antioxidant of our invention are considered to be within the scope of our invention. The hydroxybenzamide antioxidant compositions of our invention can also include a suitable vehicle which can be a fat, a fatty oil, glyceride partial ester or a solvent if desired.

We claim:

1. A composition of matter comprising a normally oxidizable material stabilized with a hydroxybenzamide compound selected from the group consisting of hydroxybenzamide compounds having the general formulas:

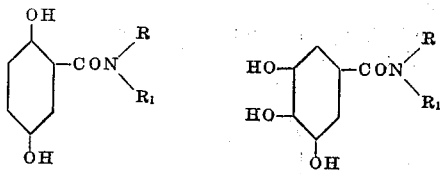

and

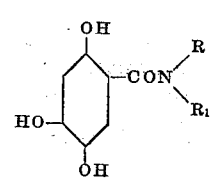

wherein each $R_1$ represents a member selected from the group consisting of a hydrogen atom, an alkyl group and a monocyclic aryl nucleus of the benzene series and each R represents a member selected from the group consisting of an alkyl group and a monocyclic aryl nucleus of the benzene series.

2. A fatty material normally subject to oxidation stabilized with a hydroxybenzamide compound defined in claim 1.

3. A hydrocarbon material normally subject to oxidation stabilized with a hydroxybenzamide compound defined in claim 1.

4. An oil normally subject to oxidation stabilized with a hydroxybenzamide compound defined in claim 1.

5. A composition of matter comprising a normally oxidizable material stabilized with a benzamide compound having the formula:

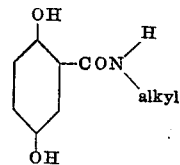

6. A composition of matter comprising a normally oxidizable material stabilized with a benzamide compound having the formula:

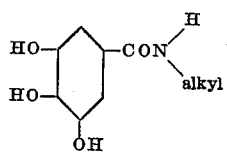

7. A composition of matter comprising a normally oxidizable material stabilized with a benzamide compound having the formula:

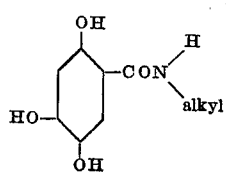

8. A composition of matter comprising a normally oxidizable material stabilized with 2,5-dihydroxybenzanilide.

9. A composition of matter comprising a normally oxidizable material stabilized with 3,4,5-trihydroxybenzanilide.

10. A composition of matter comprising a normally oxidizable material stabilized with 2,4,5-trihydroxybenzanilide.

11. Lard stabilized with 2,4,5-trihydroxybenzanilide.

12. Lard stabilized with 3,4,5-trihydroxybenzanilide.

13. Lard stabilized with 2,5-dihydroxybenzanilide.

14. Lard stabilized with N-n-butyl-2,5-dihydroxybenzamide.

15. Lard stabilized with N-dodecyl-2,5-dihydroxybenzamide.

16. The hydroxybenzamide compounds having the general formula:

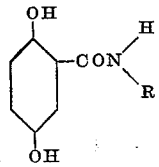

wherein R represents a member selected from the group consisting of an alkyl group and a monocyclic aryl nucleus of the benzene series.

17. The hydroxybenzamide compounds having the general formula:

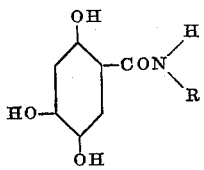

wherein R represents a member selected from the group consisting of an alkyl group and a monocyclic aryl nucleus of the benzene series.

18. Stabilized fats and fatty oils containing from about 0.005% to about 0.5% of a compound selected from the group consisting of those compounds having the following formulas:

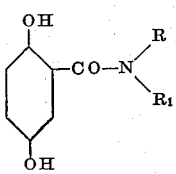 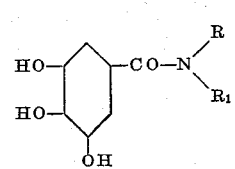

and

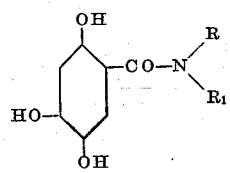

wherein each $R_1$ represents a member selected from the group consisting of a hydrogen atom, an alkyl radical, a monocyclic aryl radical of the benzene series and a pyridyl radical and each R represents a member selected from the group consisting of an alkyl group and a monocyclic aryl nucleus of the benzene series.

References Cited in the file of this patent

UNITED STATES PATENTS

| | | |
|---|---|---|
| 1,789,302 | Calcott et al. | Jan. 20, 1931 |
| 1,893,091 | Laska et al. | Jan. 3, 1933 |
| 2,070,304 | Jaeger | Feb. 9, 1937 |
| 2,654,722 | Young et al. | Oct. 6, 1953 |
| 2,694,072 | Glahn et al. | Nov. 9, 1954 |
| 2,739,066 | Bell et al. | Mar. 20, 1956 |

FOREIGN PATENTS

| | | |
|---|---|---|
| 423,938 | Great Britain | 1934 |

OTHER REFERENCES

Chem Abst., 24, page 95[5] (1930).

Riemenschneider: Trans. Am. Assor. Cereal Chem., April 1947, pages 50–63.